Sept. 17, 1935.　　　C. W. HANSELL　　　2,014,732
RADIO BEACON SYSTEM
Filed Aug. 8, 1930　　　3 Sheets-Sheet 1
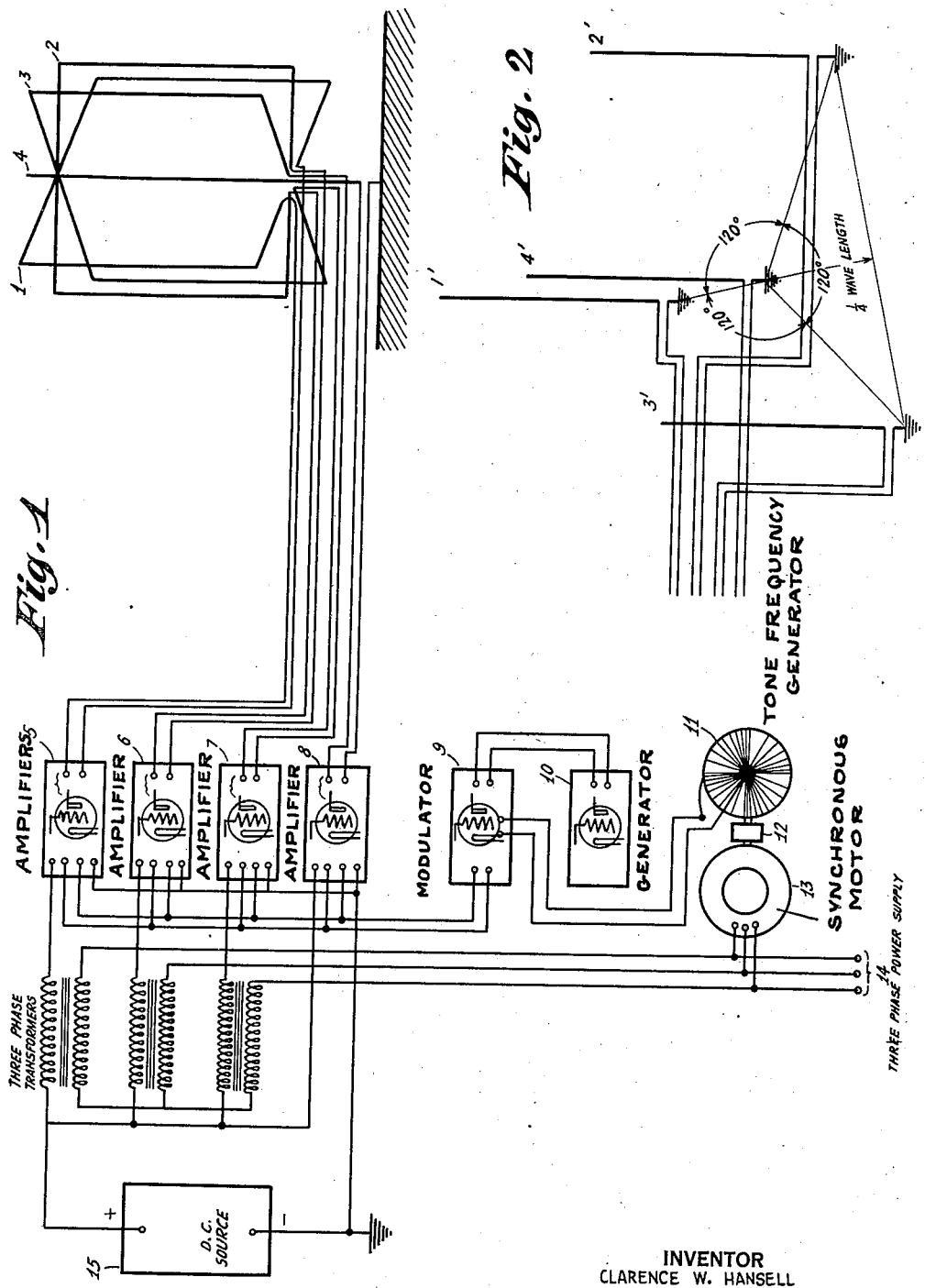
INVENTOR
CLARENCE W. HANSELL
BY
ATTORNEY Sept. 17, 1935.   C. W. HANSELL   2,014,732
RADIO BEACON SYSTEM
Filed Aug. 8, 1930   3 Sheets-Sheet 2

INVENTOR
CLARENCE W. HANSELL
BY
ATTORNEY

Sept. 17, 1935.　　　C. W. HANSELL　　　2,014,732
RADIO BEACON SYSTEM
Filed Aug. 8, 1930　　　3 Sheets-Sheet 3
*Fig. 4*
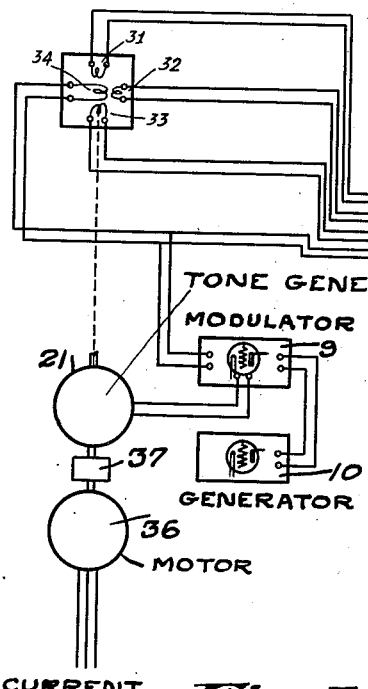
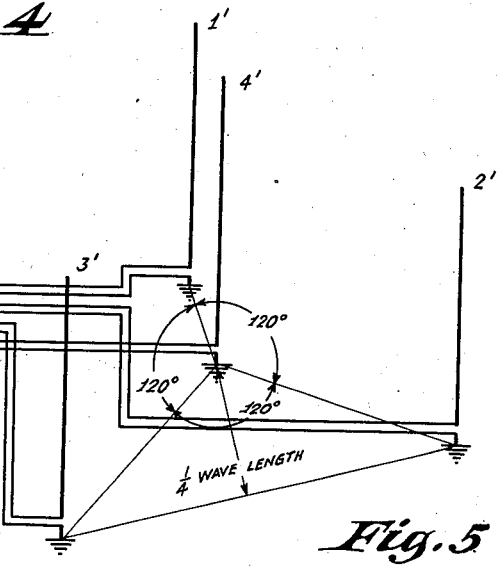
*Fig. 5*
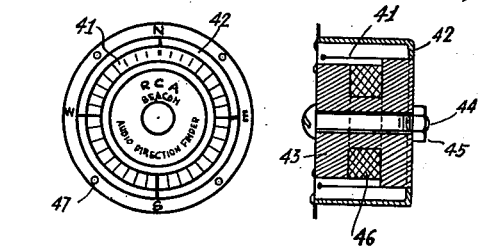
*Fig. 7*
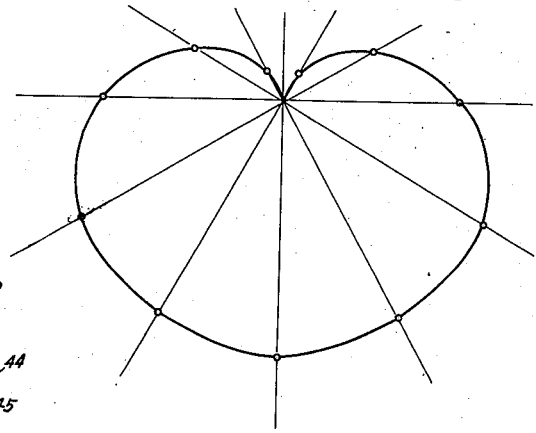
*Fig. 8*
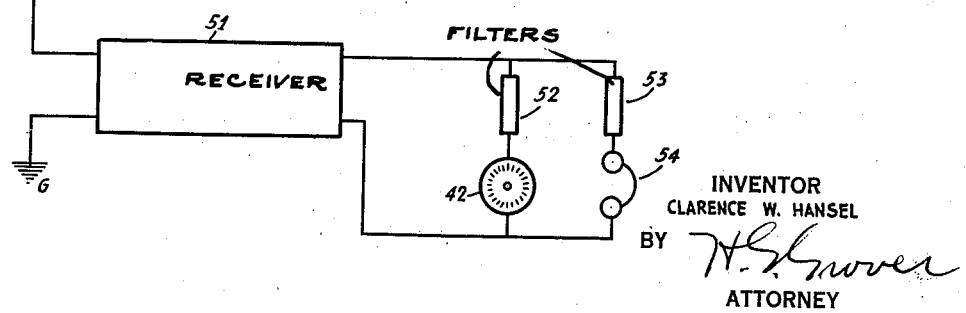
INVENTOR
CLARENCE W. HANSEL
BY
ATTORNEY Patented Sept. 17, 1935

2,014,732

UNITED STATES PATENT OFFICE 2,014,732

RADIO BEACON SYSTEM

Clarence W. Hansell, Port Jefferson, N. Y., assignor to Radio Corporation of America, a corporation of Delaware Application August 8, 1930, Serial No. 473,932

15 Claims. (Cl. 250—11)

This invention relates to improvements in or connected with directional radio apparatus and the like and in particular to an improved method and means for producing unidirectional radio transmission from an aerial system the radiations of which rotate continuously so as to lie successively along all points of the compass.

The present method and apparatus for producing radiations as described above is primarily for use at stations which serve to supply moving crafts as for instance marine ships or airships with information as to their position relative to the transmitting station at a particular time.

The use of radio beacons to guide moving craft is known in the art. In fact, at the present time the Bureau of Light Houses of the United States Government is installing systems whereby fixed radio beams are transmitted for the purpose of informing aircraft of their positions. Beacon stations now known for giving aircraft or ships the proper course are useful only for marking out either one fixed course or a plurality of fixed courses. This necessitates duplication of stations in all cases where a considerable number of courses are required. This, of course, requires duplication of the entire system, and obviously results in a great cost of money, and a waste of ground space where all available space is necessary for landing aircraft. Also a plane not on one of the fixed courses, and perhaps not intended to be on it, has no way for determining what its direction to the beacon actually is.

The primary object of the present invention is to provide a beacon system in which the number of courses which can be marked out is unlimited.

Another object of the present invention is to provide a radiating system in which the radiations are of the character known as unilateral and in which every point on the unilateral characteristic curve of the radiation as for instance, the null point is caused to rotate continuously at any desired predetermined speed to lie successively along all of the compass points.

A further object of the present invention is to provide an aerial system of the novel nature described above to be used with receivers with which by means of a novel indicating arrangement a craft carrying such a receiver may determine at any instant its position relative to the source of radiation.

The above objects are attained in accordance with the present invention by providing a fixed radiating system comprising a plurality of frame aerials located at angles with respect to each other and a vertical aerial, all of which aerials are energized at the same carrier frequency and in which the amplitude of the potential applied to the frame aerials varies cyclicly within certain limits at a predetermined frequency. The effect is much the same as that which can be obtained by actually rotating a single frame aerial which is radiating energy and simultaneously causing energy of the same frequency to be radiated from a vertical aerial so that the resulting field is represented by a cardioid which rotates with the rotation of the frame aerial. In the present invention the rate of rotation of the cardioid radiated will of course depend on the rate at which the amplitude of the carrier current in the several frame aerials is varied cyclicly between its limits. For best results the relative strength of the radiation from the frame aerials is so adjusted that it will always balance the radiation of the vertical aerial to substantially a zero value in one direction though adding to that of the vertical in the opposite direction. Also the phase relation of the radio frequency currents in the frames with respect to the current in the vertical must be alike.

Now, if this rotating transmission is modulated at an audio frequency rate which varies continuously between certain limits in accordance with the instantaneous direction of radiation, then the direction of the beacon will be indicated in a receiver by the absence of a certain audio frequently in the receiver—which indication will occur when the null point of the radiation curve is pointed towards the receiver.

In one modification of my invention the aerial system comprises a plurality of loops as for instance 3 loops set an angle of 120 degrees with respect to each other and a vertical aerial symmetrically arranged with respect to the loops. The frame aerials and vertical aerial are each energized from separate thermionic amplifiers excited by means of a single master oscillation generator so that the frequency of the oscillations in the loops and in the vertical aerial is the same. The anodes of the thermionic amplifiers are supplied by constant direct current voltage from a high voltage source. The amplitude of the effective voltage on the plate of each of the thermionic amplifiers associated with the frame aerials is varied cyclicly between certain limits by means of three phase alternating current supplied from any source as for instance a generator. This varying of the amplitude of the plate potential of the amplifiers connected with the loops will cause the energy radiated from the system to rotate about the system. The frequency of the radio frequency currents fed to each of the amplifiers may be crystal controlled. The oscillations furnished from the control oscillator may be keyed or modulated at an audio rate the pitch of which varies in an approximately linear fashion between predetermined limits in synchronism with the rotation of power between the three amplifiers and the corresponding frame aerials connected therewith. This results in that as the radiation pattern, e. g. the cardioid, rotates the tone pitch of the signal heard by a distant receiver varies with the rotation of said cardioid and has a different definite value for each position of the radiation pattern. If at the time a given audio frequency modulation or pitch is present the distant receiving station is at the zero or null point on the radiation pattern then this modulation frequency or pitch will not be heard in the receiver but all other frequencies will be heard in the receiver once during each rotation of the pattern.

More in detail for each angle at which a radio receiving station may be located with respect to the layout of the antenna system, there will be some particular audio frequency modulation which will not appear in the receiver arranged to respond to the signal modulation on the carrier. Consequently, if the receiving operator has an instrument such as a reed indicator connecting to the output circuit of his receiver, which indicator carries a frequency scale matching the frequency range covered by the modulating frequency at the transmitter then the indicator will instantly designate the direction of the transmitting station by the fact that the reed or group of reeds attuned to that particular frequency fails to vibrate or vibrates with less amplitude than the other reeds. This will indicate the direction of the beacon system from the receiver.

In a modification of the arrangement briefly described above the aerial system may comprise a plurality of vertical aerials properly spaced relative to each other and to another vertical aerial to obtain the proper directive effect, all of the aerials being fed at the same frequency while the last aerial is fed 90 degrees in phase ahead of the first mentioned aerials. The energizing circuits in this modification may be similar to the ones described above.

A further modification contemplates the use of an aerial system comprising a vertical aerial and a plurality of fixed frame aerials arranged at angles with respect to each other. Each of the frame aerials is connected to a field winding. The field windings are each associated with a rotatable winding which is energized by current from a thermionic amplifier modulator associated with the master oscillator on the one hand and a variable generator operating at audible frequency on the other hand. This coil is rotated in synchronization with the variable pitch modulator which is connected to the amplifier. The above described aerial system radiates a rotating field similar to the one produced by prior described modifications.

In the brief statements of operation of the systems described above, it is assumed that in receiving signals from the systems the null point on the rotating field is being used. The present invention, however, contemplates also a system wherein the rotating directional field has a sharp maximum and the maximum is used to determine the direction. In operation the indicator used will indicate the direction of the signal source to which it is tuned by that one or more of the reeds tuned to one or a narrow band of frequencies will vibrate more pronounced than the others and will thereby give an indication of the direction of the source of the signals.

The novel features which are considered characteristic of the present invention are set forth with particularity in the claims appended at the end of the specification. The invention, however, both as to organization and method of operation together with numerous objects and advantages, will be better understood from the following detailed description and therefrom when read in connection with the annexed drawings throughout which like reference characters indicate like parts and in which;

Figure 1 shows schematically a system constructed in accordance with the present invention and energized in a novel manner to produce a rotating field, Figure 2 shows an aerial system which may be used with an energizing source as shown in Figure 1, Figure 3 shows a modification of the arrangement of Figure 1, Figure 4 shows a modification of the arrangement of Figures 2 and 3, Figure 5 shows a characteristic radiation curve for an aerial system arranged and operated in accordance with the present invention, Figure 6 shows a curve wherein the frequency of the pitch modulation is plotted relative to the number of rotations of the radiating curve.

Figure 7 shows an indicating device to be associated with the output circuit of a receiver adapted to receive signals from the above directional aerial system, while;

Figure 8 shows a novel receiver adapted to be used with the radiating system of the prior figures.

Figure 3:
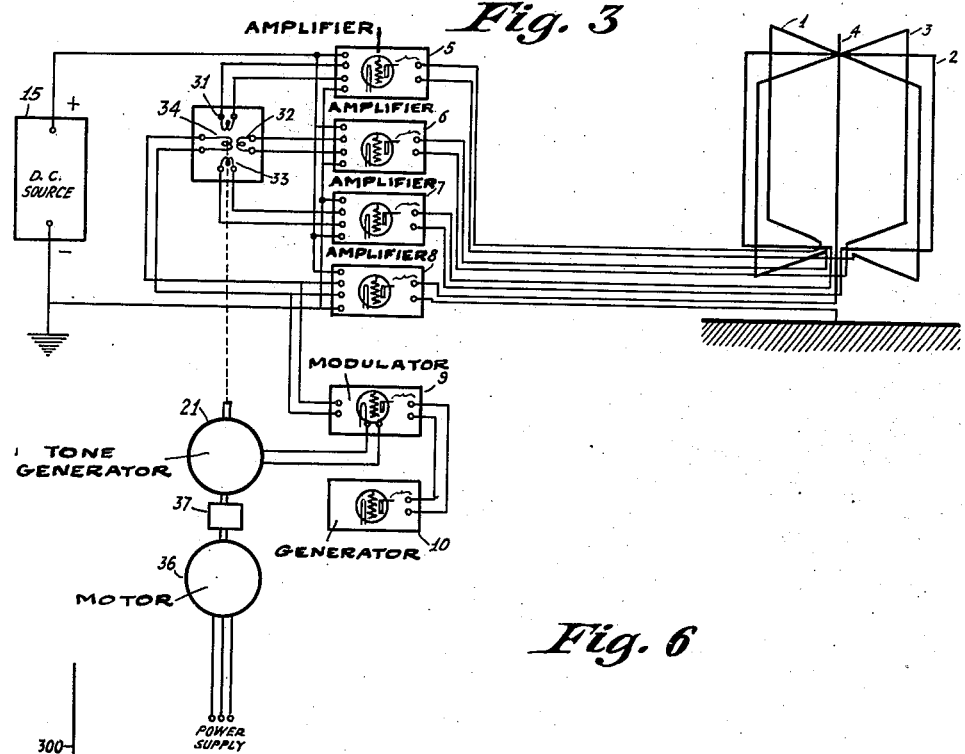

Referring to the drawings and in particular to Figure 1 thereof—the aerial system comprises a plurality of loops 1, 2 and 3 located at an angle with respect to each other, which for purposes of illustration will be taken as 120 degrees. A vertical aerial 4 is located adjacent the loops being shown symmetrically located with respect to the loops. Each of the aforementioned radiating members are connected to thermionic amplifiers 5, 6, 7 and 8 respectively. The input elements of all said thermionic amplifiers are connected in parallel with the output elements of a thermionic amplifier modulator 9 which is excited on the one hand by oscillations from a crystal controlled master oscillation generator 10, and on the other hand, by modulating currents from the commutator on a variable pitch wheel 11. The pitch of the modulating current varies synchronously with rotation of the radiation pattern of the antenna system as will be pointed out in detail hereinafter. The modulating wheel is driven through gearing 12 by a synchronous motor 13 which is in turn supplied from a three phase power source 14.

Potential is supplied to the anode cathode circuits of thermionic amplifiers 5 to 8 inclusive by means of a voltage rectifier 15 which may be supplied from any source. The aerial described above, when energized in the manner thus far set forth, will radiate a fixed field. Applicant's invention, however, requires the production of an unsymmetrical rotating field and the apparatus to produce such a field will now be described.

In order to vary cyclicly the amplitude of the potential applied to the anode cathode circuits of amplifiers 5, 6 and 7 connected to frame aerials 1, 2 and 3 respectively, a three phase nated. In this modification in which the aerial system is similar to the system of Figure 2, the rotatable goniometer coil 34 is coupled to inductances 31, 32, and 33 which are in circuit with aerials 1', 2' and 3' respectively. The inductances 31, 32 and 33 are fixed at 120 degree angles with respect to each other as in Figure 3. In this modification, however, the coils 31, 32 and 33 feed directly into the aerials 1', 2' and 3' respectively, while the aerial 4' at the center of the system is connected directly to the amplifier 9 to be energized thereby 90 degrees in phase ahead of the three aerials 1', 2' and 3'. The driving means for the rotatable coil 34 and the pitch generator 21 in this modification is similar to the driving means for the rotatable coil 34 and pitch generator used in Figure 3. The operation of the present modification will be understood readily and a statement of such operation is thought unnecessary here.

If desirable, the energizing apparatus and the driving means of the modification shown in Figure 4 may be used to energize an aerial system of the type shown in Figure 3, and comprised of the loops 1, 2 and 3 symmetrically spaced with reference to the vertical aerial 4, without departing from the spirit of the present invention. The operation of a system as proposed will follow as a matter of course from an understanding of the mode of operation of the modification described and illustrated heretofore.

All of the above described modifications may be especially adapted to use with a receiver which is used to receive both telegraph and telephone signals from two transmitters on the same carrier frequency since by insuring that field winding 34 is rotated slowly as for instance about two rotations per second and that a low pitch modulator generator wheel 21 is used as for example one generating a pitch from 150 cycles per second to 250 cycles per second or less, a receiver may be used having audio frequency filters, which separate the band of 150 to 250 cycles for use on the course indicator and allow frequencies above 250 cycles to pass to the operator's ear phones for ordinary telephone conversation or tone telegraph reception. Thus my system can be used with very little addition to the equipment needed on the plane or ship for ordinary communication purposes.

Figure 5 shows a curve characteristic of the field radiated by the aerial systems of the present invention which field rotates around the system. This curve is not meant to be accurate but is merely illustrative of the general form of the field radiated.

Figure 6:
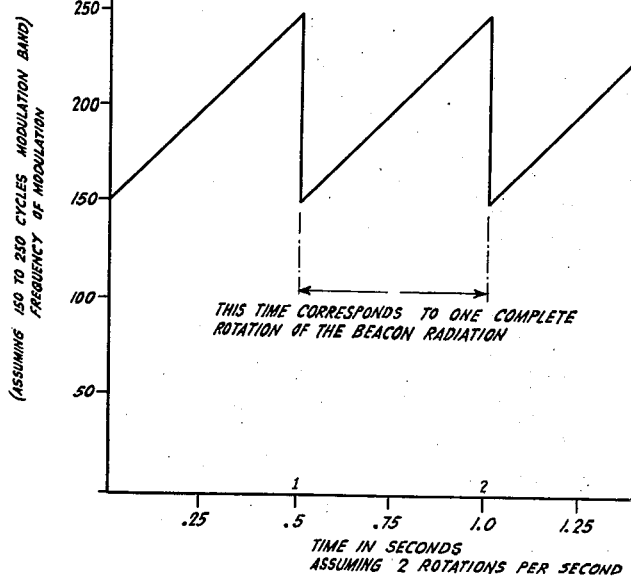

In Figure 6, the frequency of the modulation pitch generated is plotted with respect to rotations per second of the loop. In this curve which is not to be construed to limit applicant's invention in any sense the modulation frequency range is 150 cycles per second to 250 cycles per second and it is assumed that the field of the aerial system is rotating about said system at two complete rotations per second. As will be seen, on each rotation of the radiated pattern the pitch modulating frequency impressed on the carrier will vary from 150 cycles per second to 250 cycles per second. It will be readily seen from this that a receiver located at any point on the compass with respect to the aerial system will indicate in the output circuit thereof during each rotation of the radiation pattern all of the pitch frequencies except one, that is, the one characteristic of the null point of the curve. The absence of this frequency will, of course, indicate the direction of the antenna system. It will be understood that the frequency of the pitch generator, or of the rotation of the radiation pattern or both may be altered without departing from the spirit of the invention.

Any type of radio receiver known today which includes a rectifier or detector followed by an audio frequency amplifier can be utilized to receive signals transmitted by the above described aerial system. All that is required is to connect in the output circuit thereof a device as illustrated in Figure 7 of the drawings. This indicating apparatus comprises, as shown, a reed indicator having a plurality of reeds 41 each responsive to a different frequency arranged so that the frequencies follow each other in succession from minimum to maximum. The reeds are mounted in a closure member 42 for vibration in a radial direction. Member 42 also carries a form 43 retained fixed with respect to 42 by means of a bolt 44 passed through an opening in said form 43 and closure member 42 and retained therein by means of a nut 45. The support 43 carries an audio frequency magnet coil 46 which is connected in the output circuit of the receiver. This winding 46 will set up a field of varying audible frequency to which the reeds 41 will respond successively. The field built up by winding 46 will be characteristic of the nature of the modulating pitch generated by the pitch generator. Accordingly the response of the reeds 41 to said field will be characteristic of the modulation pitch. The indicator may be mounted in any appropriate position as on the instrument board in the cockpit by means of fasteners passed through openings 47 in the flange 48 on the closure member 42. Generally the N and S points fall along a line parallel with the center line of the aircraft.

A circular scale on the periphery of the ring 40 on 42 may be calibrated as shown in Figure 7 to give directly the direction from the receiver to the beacon station.

The indicator has been shown with all reeds responding more or less except several adjacent N, which have little or no motion, thereby indicating that all modulating frequencies interposed on the rotating carrier are present in the receiver except those to which the reeds not in motion respond. These reeds indicate the position of the source of the signals when the null point is used to determine direction.

In case maximum signal is used to determine direction then a sharp maximum is radiated and one or more of the reeds respond freely to one or more of the modulating frequencies superposed on the carrier at the point of maximum radiation, thereby indicating the position of the receiver relative to the source.

In Figure 8 is shown a novel receiver to be used to receive signals from an aerial system of the type disclosed above simultaneously with the reception of other signals as, for instance, weather signals, time signals, etc. The receiver comprises an antenna 50 connected through a receiver 51 to ground. The receiver 51 includes the necessary radio frequency amplifiers and a detector followed by audio frequency amplifiers where necessary. The output circuit of the receiver 51 includes a filter 52, constructed to pass only that band of frequencies superposed on the carrier frequency radiated by applicant's novel beacon system, in circuit with a reed indicator as illustrated in Figure 7. The output circuit of the receiver also includes a second band pass filter 53, constructed to transformer has a secondary winding in series in each of the connections between the high voltage source 15 and the thermionic amplifiers 5, 6 and 7 and a primary winding energized by alternating current from the three phase power supply 14 which drives the synchronous motor connected with the variable pitch modulation commutator wheel 11. The amplitude of the alternating current from the source 14 and the arrangement of the primary and secondary windings of the transformer referred to above is preferably such as to insure almost 100% amplitude modulation in the output of each of the amplifiers 5, 6 and 7. This amplitude modulation will result in that the fixed frame aerials 1 to 3 inclusive will radiate successively in such a manner as to produce with the radiation from vertical aerial 4 a rotating field known and represented in the art as a "cardioid". Furthermore, this rotating field will be modulated synchronously by means of the tone modulating wheel 11.

Obviously, a receiver, which includes in the output circuit thereof a reed indicator responsive to a band of frequencies, will indicate the direction of the source of signals since all of the reeds in said indicator will respond on each rotation of the radiation pattern except that reed or group of reeds attuned to the particular modulation frequency emitted at the instant that the null point of the cardiod is pointing toward the receiver.

In case the maximum of the radiation pattern is used to determine the direction of the source from the receiver that is receiving the signals then one reed or a narrow band of reeds tuned to the modulating frequency or frequencies superposed on the carrier at the maximum point of radiation will vibrate freely, thereby indicating the direction of the radiating system.

In receivers in which the reed indicator is not used the tone of the incoming signals will be characteristic of each point of the radiating system and will all appear in the receiver on each rotation of the pattern except one which will indicate to the operator of the receiver his position with respect to the radiating system.

In Figure 2 is shown an aerial system which may be used in place of the aerial system in Figure 1.

In this aerial system three vertical aerials are symmetrically spaced with reference to a vertical aerial in the center. The first designated vertical aerials are mounted at the corners of a triangle. The spacing is such that the central aerial is preferably spaced one quarter of a wave length from the midpoint of each side of the triangle. The radiation field of this aerial system is directive in the same respect as the aerial system disclosed in Figure 1. The aerials are energized in the same manner in which the aerials of the system shown in Figure 1 except that the vertical aerial at the axis of the system is fed by current 90 degrees in phase ahead of the phase of the current supplied to the other aerials.

Where for any reason it is preferable to use an energizing circuit other than the one shown in Figure 1 an aerial system substantially as disclosed in Figure 1 may be energized through a circuit as shown in Figure 3 in which frame aerials 1, 2 and 3 and vertical aerial 4 are each energized by means of thermionic amplifiers 5, 6, 7 and 8 respectively which are as disclosed in connection with Figure 1 each excited through a thermionic amplifier and modulator 9 which is connected on the one hand to a master oscillator 10 which supplies the constant control frequency and on the other hand to a variable pitch generator 21 which may be similar to the commutator modulator of Figure 1 or may be any known audible frequency pitch generator in general use today which will operate over the desired frequency range. The oscillations generated by the master oscillator 10 may be maintained constant by means of a crystal or by long line frequency control as illustrated in my copending application #400,489 filed October 18, 1929 now Patent 1,945,546 issued Feb. 6, 1934. The thermionic amplifier 8, which energizes the vertical aerial 4, is connected directly to the thermionic amplifier and modulator 9. The thermionic amplifiers 5, 6 and 7, having their output circuits connected to aerials 1, 2 and 3 respectively, have their input circuits associated with windings 31, 32 and 33 respectively. Windings 31, 32 and 33 are fixed preferably at 120 degree angles with respect to each other and are arranged to be coupled successively to a winding 34 connected with the output circuit of the thermionic amplifier and modulator 9. The winding 34 is symmetrically mounted adjacent windings 31, 32 and 33 on a shaft rotated by means of a drive motor 36 through reduction gearing 37.

Anode potential is applied to the output circuits of thermionic amplifiers 5, 6, 7 and 8 by means of a high voltage generator or rectifier 15 in a manner somewhat similar to that which it was applied to the corresponding amplifiers of Figure 1. In Figure 1 the amplitude of the potential effective on the anodes of the thermionic amplifiers is modulated by means of alternating current from a three phase source. In the present arrangement the potential applied to the loops 1, 2 and 3 is varied successively and progressively between predetermined limits by rotation of the coil 34 with respect to coils 31, 32 and 33. Rotating coil 34 with reference to the aforesaid coils varies the coupling between the rotating coil 34 and the fixed coils 31, 32 and 33 cyclicly. This results in varying cyclicly the amplitude of the high frequency oscillations introduced into the input circuits of thermionic amplifiers 5, 6 and 7 respectively. This, in the manner pointed out in detail above in connection with Figure 1 causes the antenna systems 1, 2, 3 and 4 to radiate a rotating field of the cardioid type. The coils 31, 32 and 33 in the present installations are set at 120 degrees with respect to each other and the coil 34 is mounted for rotation symmetrical with respect to 31, 32 and 33.

Variable pitch generator 21 rotates synchronously with the rotation of coil 34. This results that at any and every point on the compass where a receiver may be located the signal received will indicate during each rotation of the radiation pattern about the aerial system all of the frequencies generated by the variable pitch generator 21 except one which will indicate the direction of the aerial system from the receiver.

In case maximum signal reception is used to determine direction, the presence of a particular modulation frequency or a band of modulation frequencies in the receiver will indicate the direction of the source.

The operation of this modification is to a great extent similar to the operation of the modification shown in Figure 1. A further description of the present invention and of the operation thereof is thought unnecessary.

In the modification shown in Figure 4 the necessity of the amplifiers 5, 6, 7 and 8 and of the rectifier 15 and their associated circuits is eliminated pass substantially all of the audible frequencies above the band passed by the band pass filter 52, in circuit with an indicating device 54, which has been shown for purposes of illustration as a telephone.

In actual practice the present invention contemplates the use of several beacon systems, as described above, located at different points and each radiating different carrier waves, all of the carrier waves being modulated by the same band of modulation frequencies.

An operator of a receiver, as described above, may then tune the receiver to several different beacons successively and by a process of triangulation determine his exact position. Simultaneously the operator may be receiving other information as to weather conditions, etc., on the phones 54.

In all of the beacon systems described above it is necessary that the phase and frequency of the transmitted radiations be maintained constant, and free from error due to any causes as, for instance, ice on the antennas. This is accomplished in accordance with the present invention by the use of a receiving instrument at a little distance from the transmitting antennas. The instrument may actuate an alarm or actuate means to automatically make the necessary phase or frequency correction at the transmitter.

Having thus described my invention, I claim:

1. In directional radio apparatus the combination of an aerial system including a plurality of frame aerials fixed at an angle with respect to each other, a vertical aerial, a source of oscillations, an amplifier interposed between each of said aerials and said source of oscillations, means for cyclicly varying the amplitude of the oscillations impressed on said frame aerials, and means actuated in synchronism with said cyclic amplitude varying means for variably modulating the oscillations generated by said source.

2. In radio apparatus for producing a rotating unilateral field, a plurality of frame aerials located at an angle with respect to each other, a vertical aerial, a source of high frequency oscillations, means for connecting each of said aerials to said source, means for impressing modulations on said oscillations, the frequency of which modulations is characteristic of the position of said field when rotated, and means for varying successively between certain limits the amplitude of the oscillations impressed on the frame aerials to produce rotation of said field.

3. Apparatus as claimed in claim 2 in which the modulating means and the amplitude varying means are actuated synchronously.

4. The method of communication which includes the steps of producing a rotating energy field which may be represented by a cardioid curve which rotates, impressing on said field frequencies, each narrow band of which is characteristic of the position of rotation of said field and receiving energy from said rotating field and producing an indication of the narrow band of frequencies not present in said received energy.

5. An aerial system including a plurality of fixed frame aerials, a radiogoniometer having a plurality of field coils, each of said field coils being connected to one of said frame aerials, a vertical aerial symmetrically located with respect to said frame aerials, a master oscillation generator connected to said vertical aerial and to a movable coil in said radiogoniometer, a modulation frequency generator connected to said oscillation generator, and means for driving said modulation frequency generator and said movable coil synchronously.

6. A directional antenna system comprising a plurality of vertical aerials symmetrically disposed with respect to each other, an additional vertical aerial symmetrically disposed with respect to said first named aerials, a radiogoniometer having a plurality of fixed windings, each of which is connected with one of said first named aerials, a movable coil inductively coupled to said fixed coils, a carrier frequency generator connected to said rotatable coil and to said additional aerial, an amplifier in said connection, a variable modulation frequency generator connected to said amplifier, and common means for driving said generator and said movable coil.

7. A directive transmission system including a plurality of fixed frame aerials, a vertical aerial symmetrically located with respect to said frame aerials, a thermionic amplifier connected with each of said aerials, a high frequency generator connected with each of said amplifiers, a variable modulation frequency generator connected with said oscillation generator, a source of direct current for energizing each of said amplifiers and means for varying the amplitude of the effective potential on each of the amplifiers connected to the frame aerials.

8. An arrangement, as claimed in claim 7, in which the amplitude varying means and the modulation frequency generator are operated in synchronism.

9. A directive aerial system comprising a plurality of vertical aerials symmetrically placed with reference to each other and to an additional vertical aerial, a plurality of thermionic amplifiers, each having an anode circuit connected with one of said aerials, a source of direct current for energizing each of said amplifiers, a high frequency generator connected connected through an amplifier to each of said thermionic amplifiers, a variable pitch generator connected to each of said amplifiers and means for varying cyclicly the amplitude of the voltage oscillations in the output circuits of the amplifiers associated with said first named aerials in synchronism with frequency variations in said modulation generator.

10. The method of producing a continuously rotating unilateral field of radiant energy on which modulations characteristic of the position of rotation of said field are impressed, which includes the steps of, generating high frequency oscillatory energy, radiating said energy in a plurality of directive fields and in a non-directive field, said fields being overlapping, modulating the amplitude of the oscillatory energy in said directive fields cyclically to produce rotation of the energy representative of the combined fields, impressing on said high frequency oscillatory energy oscillations of audible frequency, and varying the frequency of said oscillations of audible frequency continuously between certain limits.

11. A method as recited in claim 10 in which the variations in the amplitude of the high frequency oscillatory energy and the variations in the frequency of the audible frequency oscillations are synchronous.

12. The method of producing a continuously rotating field of modulated energy which includes the steps of, producing a continuous rotary directive field of high frequency oscillations, producing a stationary field of nondirectional high frequency oscillations, superimposing and combining said fields to produce a continuously rotating unilateral field of radiant energy, and impressing on said fields before superimposition modulations which are characteristic of the position of rotation of said unilateral field.

13. The method of directional signalling which includes the steps of, producing a nondirectional or uniform field of high frequency radiant energy, producing a directional or nonuniform field of radiant energy which rotates continuously, superimposing said fields to produce a continuously rotating unilateral field, and impressing on said first named high frequency fields a continuously varying tone frequency.

14. The method of direction finding by radio which comprises, generating high frequency oscillations, dividing said high frequency oscillations into several portions, producing a continuously rotating nonuniform or directive radiant energy field with one of said portions, producing a uniform or nondirective field of radiant energy with the other of said portions, the energy in said last named field being in phase with at least part of the energy in said first named field, and impressing on said energy modulating frequencies which are characteristic of the position of rotation of said first named field.

15. A method as recited in claim 14 which includes the steps of absorbing energy from both of said fields, and demodulating said energies to render the modulating frequency which is representative of the direction from which said energies were received.

CLARENCE W. HANSELL.